United States Patent [19]

Simokat

[11] 4,050,092
[45] Sept. 20, 1977

[54] MULTI-CIRCUIT PROTECTOR

[75] Inventor: Frank L. Simokat, Babylon, N.Y.

[73] Assignee: TII Corporation, Lindenhurst, N.Y.

[21] Appl. No.: 716,196

[22] Filed: Aug. 20, 1976

[51] Int. Cl.² ............................................. H02H 9/06
[52] U.S. Cl. ........................................ 361/56; 361/91; 361/111
[58] Field of Search ................... 361/54, 55, 56, 91, 361/111, 112

[56] References Cited
U.S. PATENT DOCUMENTS

| | | | |
|---|---|---|---|
| 1,892,567 | 12/1932 | Craddock | 337/32 |
| 2,277,216 | 3/1942 | Epstein | 333/79 |
| 2,237,426 | 4/1941 | Grassnick et al. | 307/328 |
| 2,654,857 | 10/1953 | Finkel | 351/120 |
| 2,666,908 | 1/1954 | Klostermann | 339/97 P |
| 2,957,110 | 10/1960 | Boylan | 351/119 |
| 3,840,781 | 10/1974 | Brown | 351/58 |
| 3,934,175 | 1/1976 | Clark | 361/56 |

OTHER PUBLICATIONS

"Surge Protection for Sensitive Electronic Equipment" TII Corp. Brochure.
"TII Arresters are Easy to Install" TII Corp. Brochure.

Primary Examiner—Harry E. Moose, Jr.
Attorney, Agent, or Firm—Morgan, Finnegan, Pine, Foley & Lee

[57] ABSTRACT

An overvoltage protector circuit is disclosed for protecting multiple circuits, e.g. both the antenna and power circuits of a receiver, with a single unitary protector unit. The unit includes one three electrode gas tube connected across a power circuit which has a plug for connection to a wall outlet at one end and a receptacle for receiving the receiver plug at the other. The unit further includes another three electrode gas tube protector, the end electrodes of which are connected across an antenna circuit adapted to be connected at one end to the antenna and at the other end to the receiver antenna terminals (directly or via a splitter network). The ground or neutral system in the power circuit, or a separate auxiliary ground point, is connected to the casing of both overvoltage tubes.

5 Claims, 3 Drawing Figures

MULTI-CIRCUIT PROTECTOR

BACKGROUND

By way of background, it is known to employ overvoltage protection devices (also termed surge or lightning arresters) to protect telephone lines and the equipment connected to them from the direct and induction effects of lightning surges and power line potentials.

One such protection device employs a gas filled tube having an electrode at each end for connection to each of the two protected lines with the body of the tube connected to ground.

In the presence of an overvoltage condition threatening to burn out the equipment the gas in the tube ionizes and becomes conductive. As a consequence, there is created an electrical short or low impedance path from the two end electrodes through the ionized gas to the grounded center casing of the tube.

The lines are thereby shorted and grounded thus diverting the surge currents to protect the equipment.

The foregoing technique is also practiced with respect to power lines and antenna lines to protect the equipment connected to them.

In the case of a multi-circuit device, e.g. a TV or FM receiver, various proposals have been made and practiced for connecting surge arresters across the antenna leads. It is also known to connect arresters to the power circuits which energize such receivers. These arrangements, however, do not lend themselves to that type of installation capable of providing both antenna and power line protection and which can be executed reliably and safely by the average untrained consumer.

OBJECTS

It is accordingly an object of the invention to provide a unitary protector which provides overvoltage protection for multiple circuits, e.g., the signal and power circuits of a receiver, which simplifies the supplying of a ground point for protecting the signal circuits, and which is configured for simple, non-hazardous installation by the untrained lay person.

Other objects and advantages will appear from the following description or will be realized in the course of practicing the invention.

DRAWINGS

Serving to illustrate an exemplary embodiment of the invention are the drawings of which:

Figure 2:
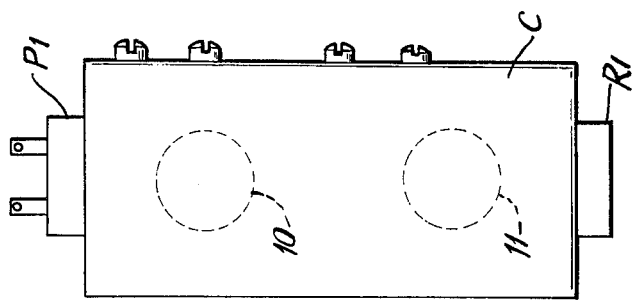
FIG. 2 is an elevation, partly schematic view of the protector of FIG. 1.

As illustrated in the figures, the protector is configured as a unitary, portable plug-in case C adapted to be interposed between the antenna lines $L_1$, $L_2$ and the antenna terminals of the receiver RV. The protector includes a power plug $P_1$ mounted on case C whereby the protector can be plugged into a wall outlet. Mounted on the opposite side of the case is an outlet receptacle $R_1$ adapted to receive the power plug $P_2$ of the receiver. The case dimensions are arranged so that when case C is plugged into one outlet of a duplex unit, it will not block the adjacent outlet(s). The case is preferably sealed to limit access.

Referring first to the power protection circuit, the residential power supplied to the selected power outlet energizes the contacts of $P_1$ thereby connecting power to lines 12A connected thereto and supplying ground to line 13.

Connected across power circuit leads 12A is an overvoltage gas tube protector 11, the end electrodes 11A of which are each connected to a respective power circuit lead 12A. The center body electrode 11B of the overvoltage tube is connected to ground line 13. From each end electrode connection 11A, a lead 12B is provided which connects in turn to one of the line contactors of the reeceptacle $R_1$. Similarly, ground lead 13 connected to center body 11B at 11D is also connected to the ground contactor of $R_1$. The ground circuit is also connected to shield SD.

From the foregoing it can be seen that a power extension circuit is provided from plug $P_1$ to receptacle $R_1$ and across this circuit is connected the overvoltage protector 11. The latter may comprise, for example, TII Model 16B.

Voltage surges appearing in the residential power circuits will be detected by tube 11 which will ionize to shortcircuit the resultant surge currents thereby protecting the circuits of receiver RV.

While a direct connection from the lines to arrester 11 has been shown, some applications may employ a limit resistor (e.g. $0.3\Omega$) between each line (end) electrode and the respective line junction 12A, 12B to control the incidence of breaker tripping or fuse blowing. Also where the illustrated ground lead is not available, a neutral lead if accessible may be used or a separate ground wire run to an earth ground point such as a water pipe.

To protect the antenna circuits another overvoltage tube 10 is employed, e.g. TII Model 21A, the end caps 10A of which are connected across the antenna lines 16A and 16B. These lines are connected at one end to the antenna lines $L_1$, $L_2$ (coupled directly to an antenna or to a cable network) via respective input terminal connectors $T_1$ and $T_2$ and are connected at their other ends to a splitter network NW and specifically to the terminals 17 and 18 thereof.

Splitter network NW may be of the conventional type for receiving VHF/UHF signals on a single line (coaxial or $300\Omega$) and for splitting the signals to provide separate UHF and VHF outputs. In the illustrated embodiment the VHF output signals appearing at terminals 19 and 20 of the network are connected to the VHF terminals 22B and 23B of the receiver via respective protector output terminals 22A and 23A.

The UHF signals which appear at terminals 20 and 21 of the splitter netowork are connected to the UHF terminals 24B and 25B of the receiver via respective output protector terminals 24A and 25A. For simplifying installation, the external terminals $T_1$, $T_2$, 22A, 23A, 24A and 25A are preferably mounted on one external surface of casing C and illustratively embodied as zerieck type binding posts.

Figure 3:
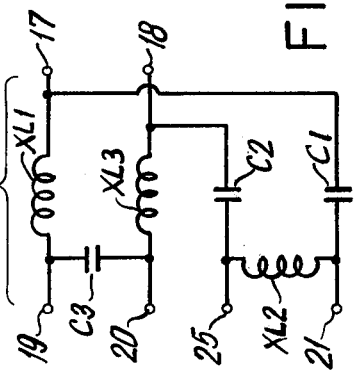
FIG. 3 is a circuit diagram illustrating an exemplary splitter network for use in the protector.
Figure 1:
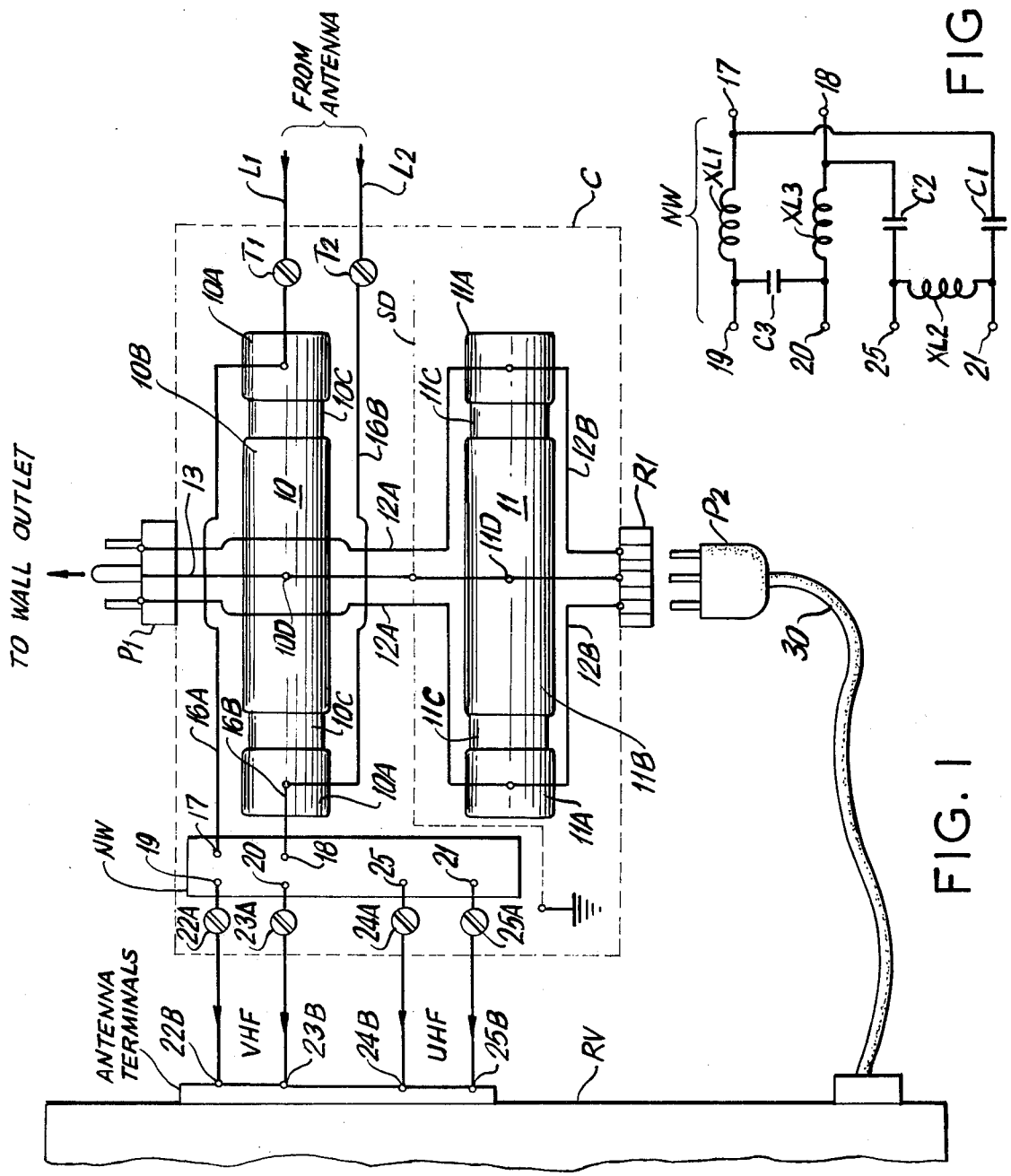
FIG. 1 is a plan schematic and partially fragmentary view of the protector according to the invention.

An exemplary splitter network is illustrated in FIG. 3. Input terminals 17, 18 supply antenna VHF signals to terminals 19, 20 via a network XL1, $C_3$XL3 and UHF signals to terminals 21, 25 via a network $C_1$, $C_2$, XL2.

To protect the signal circuits, a ground or neutral point is required for connection to the arrester and it is seen from the illustrated embodiment that this is safely and simply supplied using the power circuit ground 13 which is connected to the casing of signal protector 10 at 10D.

It can be seen from the foregoing description that surges appearing on the antenna lines $L_1$ and $L_2$ are shunted through tube 10 to ground thus protecting the antenna and related circuits of receiver RV.

In the following claims the term "ground" refers to the ground of a three wire system, the neutral of a two wire system, or a separate earthed connection.

What is claimed is:

1. A multi-circuit overvoltage protector for concurrently protecting both the power and signal circuits of equipment comprising a portable, plug-in unit:
   a. configured to be manually inserted in a pre-existing power outlet and having:
   b. plug means for making electrical contact with the contacts of said outlet;
   c. receptacle means adapted to receive a power plug connected to said power circuits of said equipment;
   d. a power circuit interconnecting said plug means and receptacle means and having a ground line;
   e. a first gas filled arrester connected across said power circuit and including a connection to said ground line;
   f. signal input connector means for receiving the output of a signal circuit;
   g. signal output connector means for supplying said signal circuit of said equipment;
   h. a signal coupling circuit interconnecting said signal input and signal output connectors; and
   i. a second gas filled arrester connected across said signal coupling circuit and including a connection to said ground line of said power circuit.

2. A protector as defined in claim 1 in which said first and second arresters are of the three terminal type.

3. A protector as defined in claim 1 in which said signal input connectors are adapted for connection to an antenna circuit.

4. A protector as defined in claim 3 in which said signal coupling network includes a signal splitting network.

5. A protector as defined in claim 1 including a shield for shielding said signal coupling circuit, said shield being connected to said ground line.

* * * * *